(12) United States Patent
Vallier et al.

(10) Patent No.: US 11,642,970 B2
(45) Date of Patent: May 9, 2023

(54) POWER-OPERATED TRAILER COMPRISING A MOTOR CONTROL DEVICE

(71) Applicant: K-RYOLE, Montrouge (FR)

(72) Inventors: Gilles Vallier, Paris (FR); Nicolas Duvaut, Marseilles (FR); Damien Duvaut, Paris (FR)

(73) Assignee: K-RYOLE, Montrouge (FR)

( * ) Notice: Subject to any disclaimer, the term of this patent is extended or adjusted under 35 U.S.C. 154(b) by 1056 days.

(21) Appl. No.: 16/080,215

(22) PCT Filed: Feb. 27, 2017

(86) PCT No.: PCT/FR2017/050422
§ 371 (c)(1),
(2) Date: Jan. 7, 2019

(87) PCT Pub. No.: WO2017/144832
PCT Pub. Date: Aug. 31, 2017

(65) Prior Publication Data
US 2019/0118670 A1    Apr. 25, 2019

(30) Foreign Application Priority Data
Feb. 25, 2016 (FR) ..................... 1651572

(51) Int. Cl.
*B60L 15/42*        (2006.01)
*B60L 50/50*        (2019.01)
(Continued)

(52) U.S. Cl.
CPC ............. *B60L 15/42* (2013.01); *B60L 50/50* (2019.02); *B60W 10/08* (2013.01); *B60W 10/18* (2013.01);
(Continued)

(58) Field of Classification Search
CPC ...... B60L 15/42; B60L 2200/28; B60L 50/50; B60W 10/08; B60W 10/18; B62D 59/04;
(Continued)

(56) References Cited

U.S. PATENT DOCUMENTS 4,771,838 A * 9/1988 Ketcham ............... B62D 12/02
                                                    180/14.2
7,743,859 B2 * 6/2010 Forsyth ................. B62D 59/04
                                                    180/65.1
(Continued)

FOREIGN PATENT DOCUMENTS

CN    102245466 A *  11/2011   ........... B60L 11/007
FR      2611611 B1    4/1991
(Continued)

OTHER PUBLICATIONS

International Written Opinion for International Application No. PCT/FR2017/050422 dated Jul. 3, 2017, 5 pages.
International Search Report for International Application No. PCT/FR2017/050422 dated Jul. 3, 2017, 2 pages.

*Primary Examiner* — Daniel L Greene
(74) *Attorney, Agent, or Firm* — TraskBritt

(57) ABSTRACT

A trailer to be attached to a cycle such as a bicycle, or a trailer-cycle set includes a device for controlling the steering and speed or deceleration of the trailer according to input control commands, the controlling device being equipped with means for measuring signals representing the longitudinal force and transverse force applied by the cycle to the trailer, the measuring means comprising sensors, including at least one deformation sensor for measuring the signal representing the longitudinal force applied by the cycle to the trailer and two sensors on the wheels of the trailer for measuring the signals representing the transverse force applied by the cycle to the trailer.

16 Claims, 4 Drawing Sheets

(51) Int. Cl.
  *B62K 27/00* (2006.01)
  *B62D 59/04* (2006.01)
  *B62M 6/40* (2010.01)
  *B62K 27/10* (2006.01)
  *B62M 6/45* (2010.01)
  *B60W 10/08* (2006.01)
  *B60W 10/18* (2012.01)

(52) U.S. Cl.
  CPC ............ *B62D 59/04* (2013.01); *B62K 27/003* (2013.01); *B62K 27/10* (2013.01); *B62M 6/40* (2013.01); *B62M 6/45* (2013.01); *B60L 2200/28* (2013.01)

(58) Field of Classification Search
  CPC ........ B62K 27/003; B62K 27/10; B62M 6/40; B62M 6/45; Y02T 10/70
  See application file for complete search history.

(56) References Cited

U.S. PATENT DOCUMENTS

| | | | | |
|---|---|---|---|---|
| 8,297,384 | B2* | 10/2012 | Wanger | B62D 59/04 |
| | | | | 180/14.2 |
| 2008/0023234 | A1 | 1/2008 | Wang | |
| 2012/0037435 | A1 | 2/2012 | Duehring | |
| 2016/0014252 | A1* | 1/2016 | Biderman | B60L 3/0061 |
| | | | | 701/29.2 |
| 2017/0144497 | A1* | 5/2017 | Guntersweiler | B60T 7/20 |
| 2017/0291658 | A1* | 10/2017 | Somerset | B62B 3/02 |
| 2020/0377094 | A1* | 12/2020 | Rabbiosi | B60L 7/18 |

FOREIGN PATENT DOCUMENTS

| | | |
|---|---|---|
| FR | 2966797 A1 | 5/2012 |
| WO | 2010/146497 A1 | 12/2010 |
| WO | 2012/095615 A1 | 7/2012 |

* cited by examiner

POWER-OPERATED TRAILER COMPRISING A MOTOR CONTROL DEVICE

CROSS-REFERENCE TO RELATED APPLICATIONS

This application is a national phase entry under 35 U.S.C. § 371 of International Patent Application PCT/FR2017/050422, filed Feb. 27, 2017, designating the United States of America and published as International Patent Publication WO 2017/144832 A1 on Aug. 31, 2017, which claims the benefit under Article 8 of the Patent Cooperation Treaty to French Patent Application Serial No. 1651572, filed Feb. 25, 2016.

TECHNICAL FIELD

This application relates to the field of towed vehicles and relates, more particularly, to a power-operated trailer intended to be coupled to a cycle, comprising a device for adapting the steering, the travel speed and/or the braking speed of the trailer when the latter is coupled to the cycle. In the present application, "cycle" means any locomotion apparatus provided with wheels and moved by the action of feet on pedals (bicycle, tricycle, tandem, etc.), including assisted-pedaling cycles such as an electric bicycle.

BACKGROUND

Power-operated trailers arranged to adapt their speed of travel and/or their braking speed according to those of the vehicle to which they are coupled are known from the prior art.

Among such trailers, those described in the applications FR 2611611 or WO 2010/146497 are known.

A travelling appliance is also known from the application WO 2012/095615, of the trailer type, able to be towed by towing means, comprising force-measurement means placed on the shaft coupling the travelling appliance to the towing means, the measuring means being configured to measure, in the coupled state of the travelling appliance, at least one signal representing the longitudinal force exerted by the towing means on the travelling appliance, or vice versa, in a direction parallel to the longitudinal axis of the travelling appliance and at least one signal representing the transverse force exerted by the towing means on the travelling appliance, or conversely, in a transverse direction with respect to the longitudinal axis of the travelling appliance. The travelling appliance also comprises drive means able to apply a rotation torque to at least one of the wheels, braking means and control means able to communicate with the force-measurement means. The control means for their part comprise control means configured to alternately control the drive means or the braking means according to the longitudinal force measured by the force-measurement means, so as to apply to at least one of the wheels of the travelling appliance an acceleration or, respectively, a braking so as to reduce the forces exerted on the coupling shaft and thus to "cancel" the weight of the travelling appliance.

The travelling appliance described in the aforementioned application does, however, have the drawback of not establishing sufficiently fine measurements of the longitudinal and transverse forces exerted at the coupling means in order to ensure precise control of the speed, braking and steering of the travelling appliance. Moreover, the action of the travelling appliance on the towing means remains limited, this being limited to being cancelled with respect to the towing means. Finally, the control of the travelling appliance offers little flexibility, since the cyclist is not able to act on the behavior of the travelling appliance during movement thereof.

BRIEF SUMMARY

The present disclosure aims to remedy these drawbacks by proposing a power-operated trailer, the speed, braking and steering of which can be precisely controlled.

Another aim of the present disclosure is to propose a trailer able to be dynamically controlled and in real time by the person travelling on the cycle to which it is coupled.

To this end, and according to a first aspect, the present disclosure proposes a trailer intended to be coupled to a cycle, the trailer comprising a chassis defining a longitudinal axis AA, the chassis comprising wheels, each wheel being coupled to an electric motor, a device for coupling the chassis to a cycle and a device for controlling the steering and speed or braking of the trailer in accordance with given command instructions, the control device comprising means for measuring signals representing forces configured to measure at least one signal representing the longitudinal force and at least one signal representing the transverse force that are exerted by the cycle on the trailer when the trailer is coupled to the cycle, and a unit controlling the motor's ability to receive the information relating to the longitudinal and transverse forces. The trailer is remarkable in that the measurement means comprise sensors among which, first, at least one of the sensors is a deformation sensor constituting the means for measuring the signal representing the longitudinal force exerted by the cycle on the trailer when the latter is coupled to the cycle, and among which, second, two sensors are situated at the wheels constituting the means for measuring the signals representing the transverse force exerted by the cycle on the trailer when the latter is coupled to the cycle.

Such an arrangement of sensors makes it possible to supply refined information relating to the transverse forces and thus to provide differentiated control of the wheels of the trailer that is more precise and in fact safer than that obtained with the trailer and cycle assemblies of the prior art.

The term "at" in the expression "situated at the wheels" should be understood in the present application as being "integrated in the wheels" or "situated close to the wheels."

Advantageously, the measurement means comprise at least two deformation sensors symmetrically fixed to the chassis with respect to the longitudinal axis of the chassis, each deformation sensor being situated in the vicinity of one of the wheels and upstream of one of the associated wheels.

"Upstream of a wheel" means the part of the chassis corresponding to the front of the trailer, the axis passing through the hub of the wheels and the trailer delimiting the front part from the rear part of the trailer. In other words, the deformation sensors are carried by the part of the chassis lying between the wheels and the coupling device.

The offsetting of the deformation sensors on the chassis, these being provided in the prior art on the coupling device, makes it possible to offer precise measurements of the longitudinal forces exerted on each side of the trailer and thus to arrive at a better interpretation of the transverse forces exerted at the coupling axis.

Advantageously, the chassis is formed by two longitudinal members, to each of which a wheel is fixed, each longitudinal member comprising a deformation sensor disposed at a distance from the associated wheel less than half the distance separating the hub of the wheel from the end of the longitudinal member closest to the coupling device.

According to a variant embodiment, the measurement means comprises a deformation sensor integrated in the coupling device and two position sensors, each associated with the motor of one of the wheels. The deformation sensor thus makes it possible to measure the longitudinal force while the position sensors make it possible to characterize the speed of each of the wheels, the combined measurement of the two speeds representing the transverse force. The advantage of this variant embodiment is simplifying the manufacture of a trailer provided with a control device according to the disclosure, as well as to make maintenance thereof easier, while keeping precision of the information relating to the transverse forces similar to that obtained with the variant previously described in which the sensors used are deformation sensors offset in the vicinity of the wheels of the trailer.

Advantageously, provision may be made for the coupling device to comprise two coupling bars intended to be fixed respectively to the bicycle and to the trailer and connected together by a connection part constituting the deformation sensor. In order to avoid abrupt and uneven variations in temperature of the deformation sensor, provision may be advantageously arranged to dispose a thermal insulator between the connection part and the coupling bars at the connection.

Advantageously, the control unit comprises an algorithm for slaving the movement of the trailer to the movement of the cycle when the trailer is coupled to the cycle. The algorithm is configured to control the motors according to an operating mode of the trailer selected from operating modes implemented in the control unit and measured signals representing the longitudinal and transverse forces. The operating modes implemented comprise a so-called "cancellation" mode of the trailer in which the motors are controlled according to a value of the measured signal of the longitudinal force slaved to a value corresponding to a zero longitudinal force, a so-called "pushed" mode of the trailer in which the motors are controlled according to a value of the measured signal representing the measured longitudinal force slaved to a value corresponding to a negative longitudinal force, and a so-called "resistant" mode of the trailer in which the motors are controlled according to a value of the measured signal representing the measured longitudinal force slaved to a value corresponding to a positive longitudinal force.

Advantageously, the operating modes implemented in the control unit are selected and actuated by a remote-control device, preferably fixed to the handlebars of the cycle.

Advantageously, the control device further comprises an electric brake gate able to be fixed to the gate of one of the mechanical brakes of the cycle.

Advantageously, the trailer comprises at least one battery rechargeable during the functioning of the trailer in resistant mode and/or when the electric brake gate is actuated.

Advantageously, the deformation sensor comprises at least two deformation gauges disposed at 90 degrees from one another, one of the gauges being oriented along the longitudinal axis AA of the chassis.

Advantageously, the control unit comprises a module for comparing the speed of the trailer with an intermediate threshold speed and a maximum threshold speed recorded in a memory module of the control unit.

Advantageously, the trailer comprises at least one photovoltaic module.

The disclosure also relates to a cycle coupled to a trailer as described above, the remote-control device of which, arranged to communicate with the control unit of the trailer and, in particular, to allow selection of an operating mode among the operating modes implemented in the control unit, is fixed to the handlebars of the cycle.

Advantageously, the cycle comprises an electric brake gate fixed to the gate of one of the mechanical brakes of the cycle. "Mechanical brakes" means the conventional (i.e., existing) brakes of the cycle.

The trailer according to the disclosure has the advantage of being able to be slaved, not only so as to eliminate its weight to follow the cycle, but also to push the cycle and, therefore, to relieve the cyclist or to brake the cycle.

Another advantage of the trailer according to the disclosure is to allow real-time parameterizing by the cyclist of the required operating mode of the trailer (cancellation, pushing or braking).

Another advantage of the trailer according to the disclosure is to allow, in resistive mode, recovery of the braking energy conjointly of the cycle and of the trailer.

BRIEF DESCRIPTION OF THE DRAWINGS

Other objects and advantages of the disclosure will emerge during the following description given with reference to the accompanying drawings, in which.

DETAILED DESCRIPTION

In relation to FIGS. 1 to 6, an example embodiment of an assembly comprising a bicycle 1 coupled to a trailer 2 is described.

The trailer 2 comprises a chassis 3, of longitudinal axis AA, comprising two horizontal longitudinal members 3A, 3B, parallel to one another, on each of which a wheel 4A, 4B is fixed. The wheels 4A, 4B are fixed either directly or by means of an axle support. The figures illustrate a trailer comprising only two wheels 4A, 4B. It is, of course, obvious that the disclosure is not limited to this configuration and that a trailer equipped with a plurality of pairs of wheels can be provided without departing from the scope of the invention.

Figure 1:
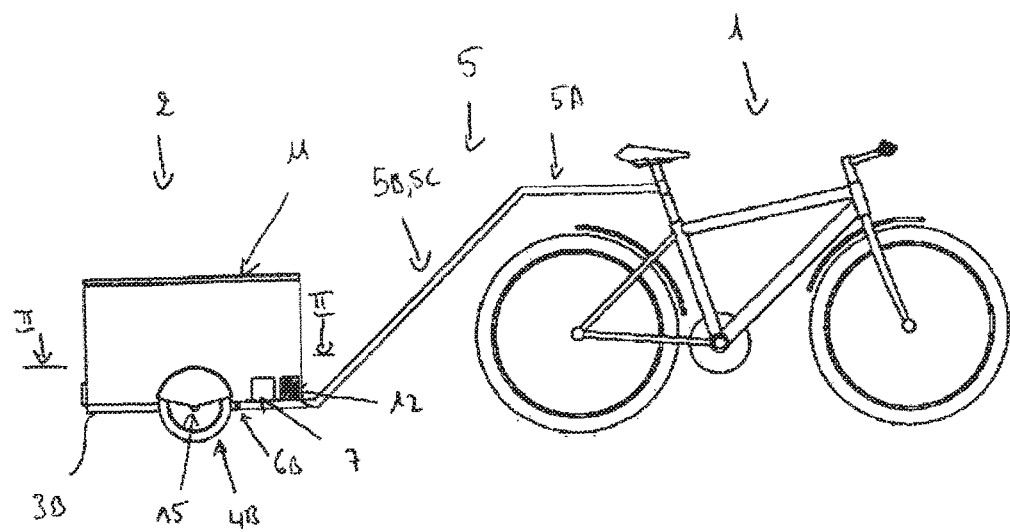
FIG. 1 is a schematic side view of a coupled bicycle/trailer assembly according to a first example embodiment of the disclosure.
Figure 2:
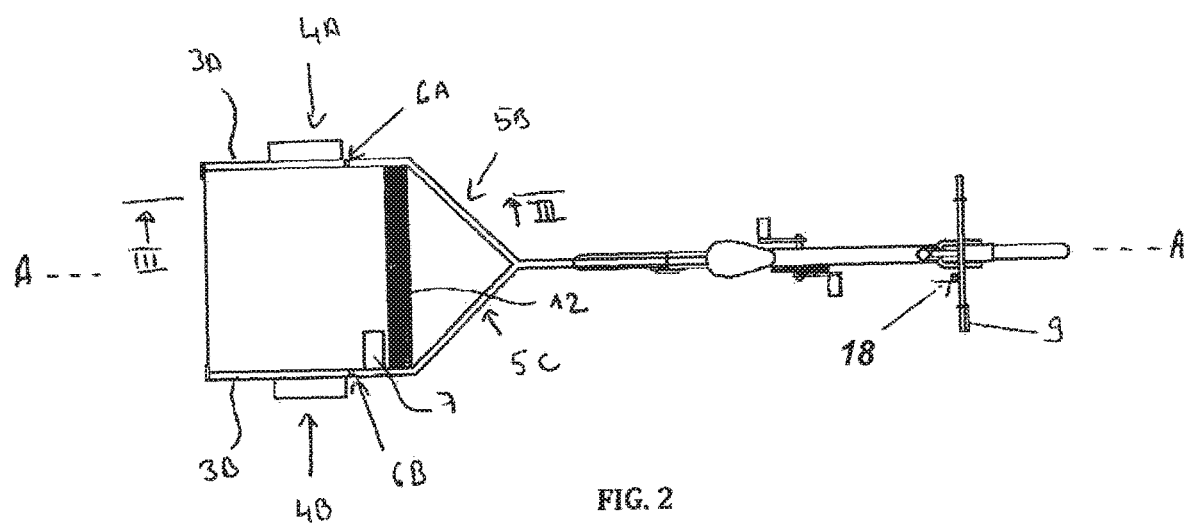
FIG. 2 is a cross-sectional view from the top along the axis II-II of the trailer/bicycle assembly illustrated in FIG. 1.

According to a preferred embodiment, each wheel 4A, 4B is coupled to a motor 15 that is chosen so as to be reversible in order to allow, when the trailer is coupled to the bicycle 1, operation firstly as a motor in order to make the trailer or the trailer/bicycle assembly travel and secondly as a generator in order to brake the trailer or the trailer/bicycle assembly. The advantage of providing one motor per wheel is to allow a differentiated control of the wheels 4A, 4B. Moreover, in order to limit the space requirement and to simplify the transmission between the motors of the wheels, each motor is advantageously integrated with a wheel (FIG. 1). Advantageously, the motors are DC motors with permanent magnets without stepping down.

The trailer 2 is fixed to the bicycle 1 by means of a coupling device 5. In the embodiment illustrated, the coupling device 5 comprises a first connection arm 5A provided at one of the ends thereof with a head for coupling to the bicycle 1, and a second and third connection arms 5B, 5C, symmetrical with one another with respect to the first connection arm 5A and secured to the first connection arm 5A. Each longitudinal member 3A, 3B is secured by one of its ends (the end closest to the bicycle 1) to the second and third connection arms 5B, 5C. The coupling device 5 thus has a structure with a substantially tetrahedral shape.

Advantageously, the coupling head of the coupling device is arranged to allow easy and rapid connection and disconnection of the trailer 2 to and from the bicycle 1. According to a particular embodiment, a damper device integrated in the coupling head may be provided in order to de-rigidify the trailer/bicycle connection and thus prevent the transmission of jumps or jolts suffered by the bicycle to the trailer and vice versa. A trailer/bicycle connection system of the double pivot, swivel or similar type may also be provided in replacement for or in addition to the damper device. As illustrated in FIG. 1, the coupling device 5 is arranged to be fixed to the shaft of the saddle. The attachment head is designed to adapt to any type of bicycle and to guarantee simple and secure attachment of the trailer 2 to the bicycle 1. According to a particular variant embodiment, the attachment head of the coupling device 5 is formed in two parts, one of the two parts being intended to be fixed to the bicycle 1, the other part being provided at the end of the coupling device, the parts being arranged to come into engagement with one another, such as, for example, by snapping on.

Advantageously, each longitudinal member 3A, 3B comprises a deformation sensor 6A, 6B intended to measure in real time the signals representing the longitudinal traction and/or compression forces exerted on each side of the trailer 2. The combination of the measurements of these two sensors will give the information relating to the longitudinal and transverse forces exerted by the bicycle on the trailer. According to the disclosure, each deformation sensor 6A, 6B is situated in the vicinity of a wheel 4A, 4B, upstream of the wheel 4A, 4B. "Upstream of the wheel" designates the part of the chassis extending toward the front of the bicycle/trailer assembly, that is to say, the part of the chassis 3 closest to the bicycle 1. As illustrated in FIGS. 1 to 4, the deformation sensors 6A, 6B are disposed at a distance from the associated wheel 4A, 4B less than half the distance separating the hub of the wheel 4A, 4B from the end of the longitudinal member 3A, 3B closest to the bicycle 1. The deformation sensors 6A, 6B are connected to a control unit 7 described below via suitable cabling.

Figure 5:
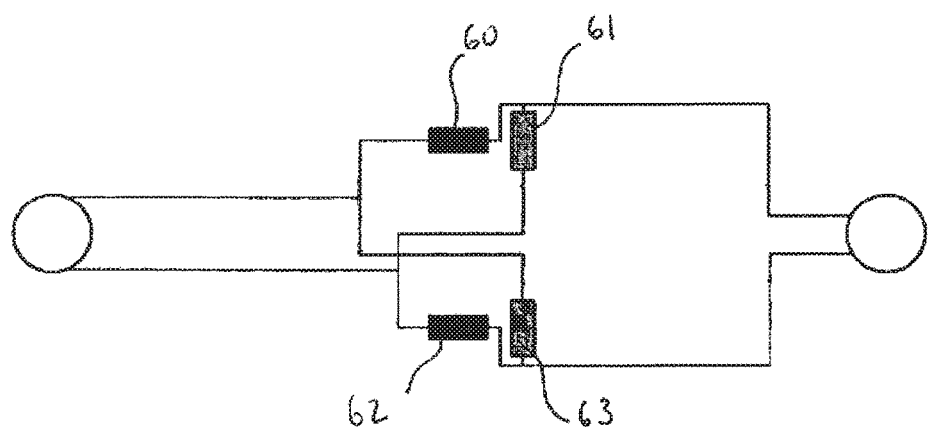
FIG. 5 is an assembly diagram of the force sensor illustrated in FIG. 3.

Advantageously, the deformation sensors 6A, 6B are deformation gauge sensors. In the embodiment illustrated, they comprise four deformation gauges mounted in a Wheatstone bridge (FIG. 5). More particularly, each deformation sensor 6A, 6B comprises four deformation gauges 60, 61, 62, 63, two of the opposite gauges 60, 62 being oriented along the longitudinal axis AA of the chassis 3, advantageously symmetrically with one another with respect to the axis of the longitudinal member with which they are associated (axis parallel to the axis of the chassis), the other two (gauges 61, 63) being oriented orthogonally to the axis of the associated longitudinal member to which they are fixed, advantageously symmetrically with one another with respect to the axis of the longitudinal member. This is, of course, one example embodiment, the deformation sensors not being limited to this configuration. In particular, sensors having an assembly of two deformation gauges and two resistors may be provided.

Figure 3:
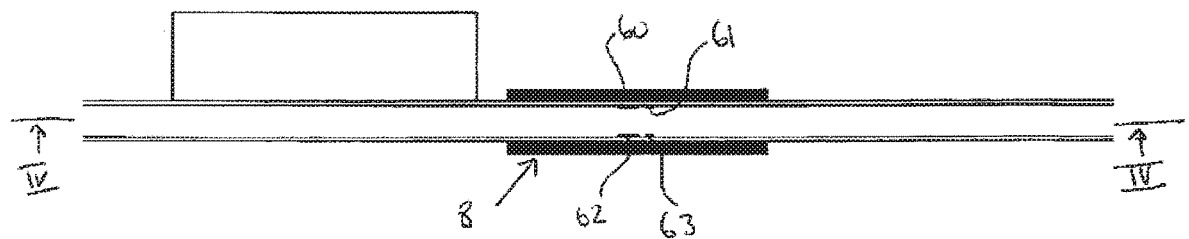
FIG. 3 shows a detailed view of the trailer illustrated in FIG. 2.
Figure 4:
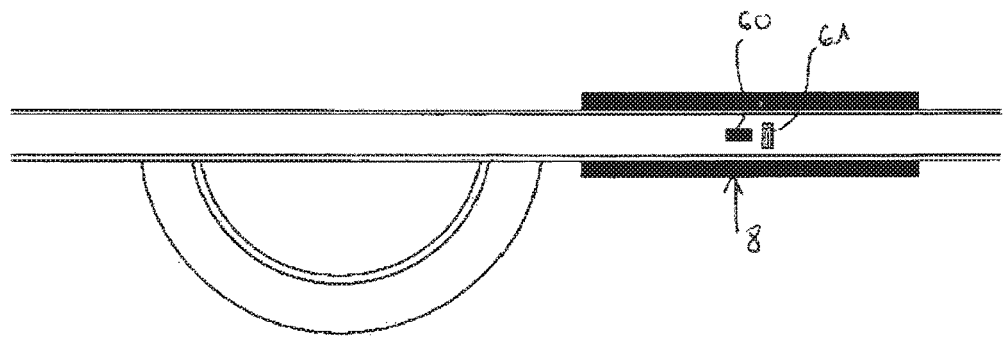
FIG. 4 is a cross-sectional view along the axis IV-IV of the trailer illustrated in FIG. 3.

In order to protect the deformation gauges 60 to 63 but also the structure surrounding the gauges from any impacts, each longitudinal member 3A, 3B is advantageously surrounded by a protective sheath 8 (FIGS. 3 and 4). In the embodiment illustrated, each protective sheath 8 is designed to partially surround the associated longitudinal member 3A, 3B, on the portion carrying the gauges.

According to an advantageous embodiment, other deformation gauges may also be provided, disposed so as to allow a measurement of the forces in the vertical plane. Such measurements will make it possible, when recorded and taken into account by the control unit 7, to adapt the control of the motors for optimum fluidity of driving, and thus facilitate the passing of "small obstacles" such as potholes, pavements, etc.

The control unit 7 controls the functioning of each of the motors 15 for speed with a view to controlling the steering and acceleration or braking of the trailer, and/or the acceleration or braking of the bicycle/trailer assembly, according to the forces measured by the deformation sensors 6A, 6B and according to an operating mode selected by the user of the bicycle 1 among the operating modes implemented in the control unit 7. More specifically, three operating modes have been implemented in the control unit 7: a so-called "cancellation" mode, a so-called "pushed" mode and a so-called "resistant" mode. More particularly, the "cancellation" mode corresponds to the mode in which the trailer 2 cancels out its own weight by action of its motors in order to follow the bicycle 1 whatever its speed. The "pushed" mode corresponds to the mode in which the trailer 2 pushes the bicycle and, therefore, relieves the effort of the cyclist by action of its motors. The "resistant" mode corresponds to the mode in which the motor torque is resistant, the trailer 2 then braking the bicycle 1 and allowing conjointly the recharging of one or more batteries 12 provided on the trailer 2.

According to the modes selected, the control unit 7 slaves the longitudinal force value measured by each of the deformation sensors 6A, 6B to a zero value in "cancellation" mode (energy consumption), a negative value (compression) in "pushed" mode (increased energy consumption), and a positive value (traction) in "resistant" mode (recharging), and in all the modes, indirectly slaves the value of the transverse force at the coupling shaft to a zero value, which enables the trailer to follow the same path as the cycle without any transverse force on the cycle.

So that the person using the bicycle 1 can select the operating mode (cancellation, pushed, resistance) among the operating modes implemented on the control unit 7, the bicycle 1 comprises a control device (or control interface), of the touch screen 18 type, offset from the trailer 2, in order to be advantageously arranged so as to be accessible to the user, in particular, when the latter is travelling by bicycle 1. In the embodiment illustrated, the touch screen 18 is fixed to the handlebars of the bicycle 1. Advantageously, the values of the intermediate and maximum threshold speeds stored in the control unit 7 can be modified from the touch screen 18. The touch screen 18 and the control unit 7 are arranged to exchange data wirelessly. According to a particular embodiment, provision may be made for a Smartphone or the like to constitute the control interface. In this case, the connection of the Smartphone with the control unit 7 is achieved via a dedicated application. The Smartphone is fixed to a base optionally containing an auxiliary battery for the purpose of recharging thereof. According to a particular configuration, the control face makes it possible to activate or deactivate the indicator lights placed at the rear of the trailer 2 to which the interface is connected.

The control unit 7 further comprises a module for comparing the speed of the trailer/bicycle assembly measured by the sensors 16 of the motors 15 (sensors of the Hall effect type), with an intermediate threshold speed and a maximum threshold speed recorded in a memory module of the control unit 7. The intermediate threshold speed corresponds, for example, to a legal electrically assisted bicycle speed limit, while the maximum threshold speed corresponds to the speed established as not having to be exceeded by the bicycle 1 coupled to a trailer 2. The latter speed is termed the safety speed. Thus, the legal electrically assisted bicycle speed limit may be, for example, 25 km/h. The maximum threshold speed can be fixed, for example, at 35 km/h. When the trailer/bicycle assembly is moving at a speed greater than the intermediate threshold speed, the control unit 7 cancels the "pushed" mode, automatically actuating by replacement the "cancellation" mode, and the latter stopping automatically beyond the maximum threshold speed, the trailer 2 then going into "resistant" mode.

Figure 6:
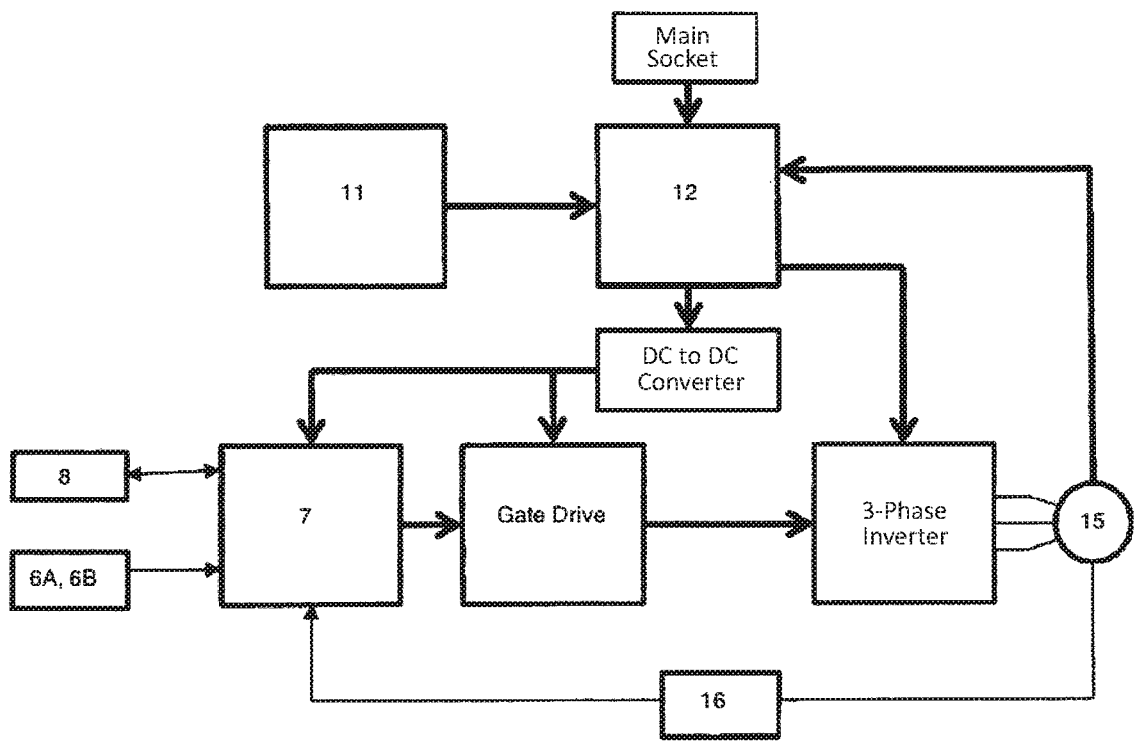
FIG. 6 is a block diagram of the device for controlling the speed or braking of the trailer implemented in the assembly illustrated in FIG. 1.
Figure 7:
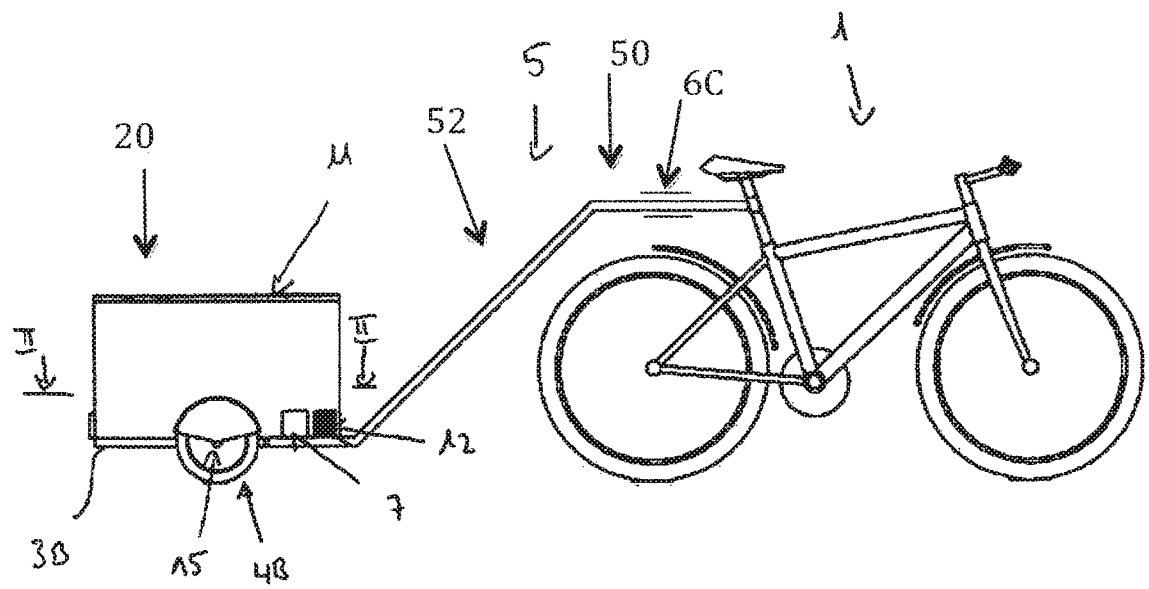
FIG. 7 is a schematic side view of a coupled bicycle/trailer assembly according to another example embodiment of the disclosure.

As will be understood, the control unit 7, therefore, constitutes the intelligence of the trailer 2, functioning by means of a control algorithm installed in the control unit 7. It takes into account the data sent by the deformation sensors 6A, 6B, the operating mode (cancellation, pushed or resistant) selected by the user on the control interface and the speed of each of the motors 15 measured by the dedicated sensor 16 associated with each motor 15. The control unit 7 calculates from these data the force value that each deformation sensor 6A, 6B should measure and accordingly controls the motors in real time by a voltage command in order to slave the sensors to the programmed force value. The voltage control is achieved via an electronic card. FIG. 6 illustrates the block diagram of all the components involved in the control of the trailer, in connection with the control unit.

According to the range required and the maximum loading weight required, the trailer 2 may comprise one or more batteries 12. A socket for recharging the battery 12 is preferably integrated in the trailer 2 for recharging of the urban electrical terminal type. Provision may also be made for the battery 12 to be removably fixed to the trailer 2 so as to allow recharging on the main power in a dwelling. The battery 12 is advantageously chosen to offer a sufficient energy capacity to allow recharging of electronic apparatus (telephones, computers) but also for optionally providing recharging of appliances with a greater energy consumption loaded on the trailer 2, e.g., refrigerator, hotplate, coffee machine, icebox, etc.

Advantageously, the trailer 2 comprises one or more photovoltaic modules 11, preferably of the flexible monocrystalline type. The photovoltaic modules are preferably provided on the top part of the trailer 2. The advantage of the presence of the photovoltaic modules 11 is recharging the battery 12 and thus extending the range thereof, independently of whether the trailer 2 is in motion or at rest. Other known means or technologies for extending the range of the battery 12 may also be provided in addition to or in replacement for the photovoltaic modules.

Advantageously, the bicycle 1 comprises an electric brake gate 9. Like the control interface, the electric brake gate 9 is a member offset from the trailer 2. It is fixed to one of the mechanical brake gates of the bicycle, preferably the gate corresponding to the rear wheel brake, and is arranged so as to be actuated with the mechanical brake: when the user "presses" on the brake, the electric brake gate 9 is activated first, until it is put in abutment, "putting in abutment" corresponding to the maximum braking power of the motors, in order to be relayed automatically by the mechanical brake in the case of pressure going beyond the abutment of the gate of the electric brake gate 9. This system thus enables the cyclist, in the case of emergency braking, to naturally reinforce, that is to say, without any additional action on his part, the action of the electric brake gate 9 with the mechanical brake once the electric brake gate 9 is in abutment. The braking means of the bicycle 1 are thus highly economical and the braking energy is recovered optimally by virtue of the recovery of the kinetic energy of the bicycle. The electric brake gate 9 also sends its data to the control unit via a wireless (radio or BLUETOOTH®) connection and draws its energy for measuring and sending the data on the pressure exerted by the user during braking, thus providing a completely autonomous electric brake gate 9.

FIGS. 7 to 10 illustrate another example embodiment of a trailer according to the disclosure.

The trailer 20 according to this example repeats all the previously described features apart from the arrangement of the measurement means used for the purpose of differentiated control of the trailer wheels. In this example, the measurement means of the control device of the trailer comprise a deformation sensor (6C) integrated in the coupling device and two position sensors (not shown) respectively associated with the motor of one of the wheels. Each position sensor, of the Hall effect sensor type, thus makes it possible to measure the speed of the motor of the wheel with which it is associated. The trailer further comprises a coupling device arranged to allow integration of the deformation sensor 6C.

Figure 8:
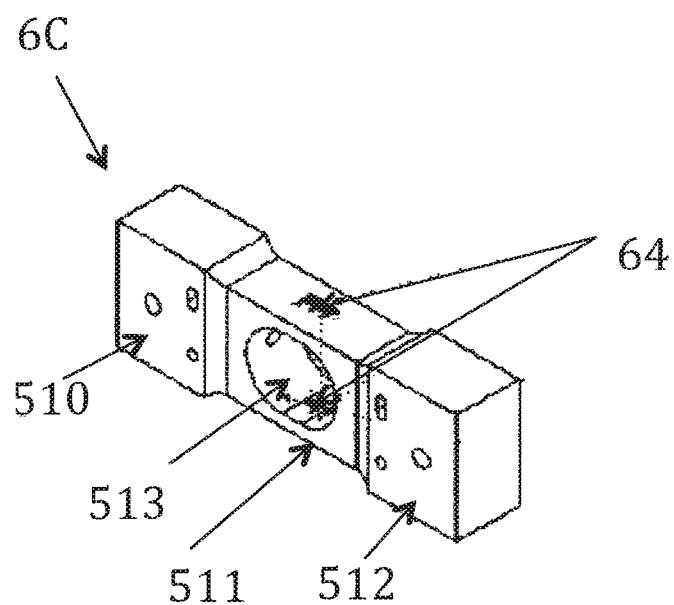
FIG. 8 is a detailed view of the part carrying the deformation sensor integrated in the coupling device of the assembly shown in FIG. 7.

More particularly, the coupling device 5 comprises, in the embodiment illustrated, two tubular coupling bars 50, 52, one of the bars 50 being intended to be fixed to the bicycle 1, the other coupling bar 52 being intended to be fixed to the trailer 20. The coupling bars 50, 52 are connected together by a connecting piece that constitutes the deformation sensor 6C (FIG. 8).

In the example illustrated, the connecting piece (or deformation sensor 6C) is formed by a central part 511 carrying the deformation gauges 64 and two end parts 510, 512 arranged to allow fixing of the central part 511 to one of the two coupling bars 50, 52. The central part 511 comprises a through hole 513 sized so as to confer on the connecting part a deformable character and thus to allow a precise measurement of the signal representing the longitudinal deformation of the part.

In the example illustrated, the central part 511 comprises four deformation gauges disposed in pairs, each element of the pair being on either side of the through hole 513, one of the pairs being oriented along the axis of the coupling device (corresponding to the axis of the chassis), the other pair being positioned orthogonally to the axis.

Figure 9:
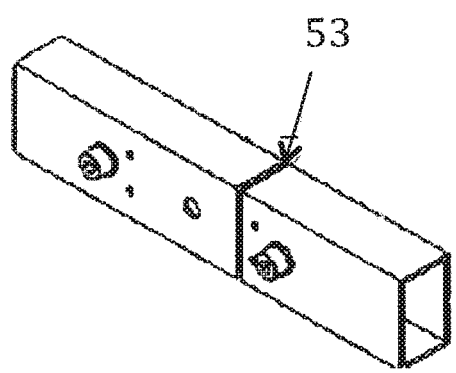
FIGS. 9 and 10 are detailed views of the part of the coupling device in which the deformation sensor is integrated.
Figure 10:
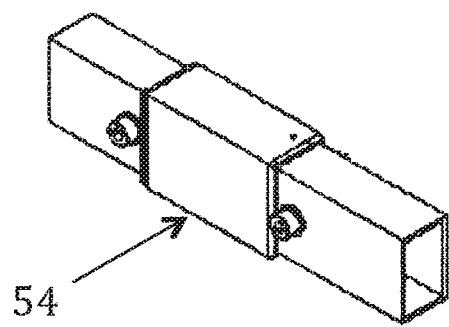

The connecting part is housed inside the two coupling bars 50, 52 so as to extend on either side of the junction zone 53 of the two coupling bars 50, 52, and is fixed to them as illustrated in FIG. 9 in accordance with fixing means and fixing techniques known to persons skilled in the art. In order to mechanically and thermally protect the junction zone 53 between the two coupling bars, provision may be made for equipping the coupling device 5 with a protective sleeve 54 placed around the junction zone 53 (FIG. 10).

The disclosure is described above by way of example. Naturally, a person skilled in the art is in a position to implement various variant embodiments of the disclosure without departing from the scope of the invention.

The invention claimed is:

1. A trailer intended to be coupled to a cycle, the trailer comprising:
    a chassis defining a longitudinal axis and comprising wheels, each of the wheels being coupled to an electric motor,
    a device for coupling the chassis to the cycle, and
    a control device for controlling the steering and speed or braking of the trailer in accordance with given command instructions, the control device comprising:
        means for measuring signals representing forces configured to measure at least one signal representing a longitudinal force and at least one signal representing a transverse force, the forces being exerted by the cycle on the trailer when the trailer is coupled to the cycle, and
        a unit for controlling the motors able to receive the information relating to the longitudinal and transverse forces,
    wherein, the measurement means comprises sensors, among which, first, one of the sensors is at least one deformation sensor comprising the means for measuring the signal representing the longitudinal force exerted by the cycle on the trailer when the trailer is coupled to the cycle, and among which, second, two sensors integrated in the wheels or on the chassis at a distance from the associated wheel less than half the distance separating a hub of the associated wheel from the end of the chassis closest to the device for coupling the chassis to the cycle, the two sensors comprising the means for measuring the signal representing the transverse force exerted by the cycle on the trailer when the trailer is coupled to the cycle.

2. The trailer of claim 1, wherein the control unit comprises a module for comparing the speed of the trailer with an intermediate threshold speed and a maximum threshold speed recorded in a memory module of the control unit.

3. The trailer of claim 1, wherein the deformation sensor comprises at least two deformation gauges disposed at 90 degrees from one another, one of the gauges being oriented along the longitudinal axis of the chassis.

4. The trailer of claim 1, wherein the control unit comprises an algorithm for slaving the movement of the trailer to the movement of the cycle when the trailer is coupled to the cycle, the algorithm being configured to control the motors according to an operating mode of the trailer selected from operating modes implemented in the control unit, measured signals representing the longitudinal and transverse forces, the operating modes implemented comprising a cancellation mode of the trailer in which the motors are controlled according to a value of the measured signal of the longitudinal force slaved to a value corresponding to a zero longitudinal force, a pushed mode of the trailer in which the motors are controlled according to a value of the measured signal representing the measured longitudinal force slaved to a value corresponding to a negative longitudinal force, and a resistant mode of the trailer in which the motors are controlled according to a value of the measured signal representing the measured longitudinal force slaved to a value corresponding to a positive longitudinal force.

5. The trailer of claim 1, wherein the measurement means comprises at least two deformation sensors fixed to the chassis, symmetrically with respect to the longitudinal axis of the chassis, each deformation sensor being situated in the vicinity and upstream of one of the associated wheels.

6. The trailer of claim 5, wherein the chassis is formed by two longitudinal members on each of which a wheel is fixed, each longitudinal member comprising a deformation sensor disposed at a distance from the associated wheel less than half the distance separating the hub of the wheel from the end of the longitudinal member closest to the coupling device.

7. The trailer of claim 1, wherein the measuring means comprises a deformation sensor integrated in the coupling device and two position sensors each associated with the motor of one of the wheels.

8. The trailer of claim 7, wherein the coupling device comprises two coupling bars intended to be respectively fixed to the bicycle and to the trailer and connected together by a connecting part including the deformation sensor.

9. The trailer of claim 8, wherein the control unit comprises an algorithm for slaving the movement of the trailer to the movement of the cycle when the trailer is coupled to the cycle, the algorithm being configured to control the motors according to an operating mode of the trailer selected from operating modes implemented in the control unit, measured signals representing the longitudinal and transverse forces, the operating modes implemented comprising a cancellation mode of the trailer in which the motors are controlled according to a value of the measured signal of the longitudinal force slaved to a value corresponding to a zero longitudinal force, a pushed mode of the trailer in which the motors are controlled according to a value of the measured signal representing the measured longitudinal force slaved to a value corresponding to a negative longitudinal force, and a resistant mode of the trailer in which the motors are controlled according to a value of the measured signal representing the measured longitudinal force slaved to a value corresponding to a positive longitudinal force.

10. The trailer of claim 9, wherein the trailer comprises at least one battery rechargeable during the operation of the trailer in resistant mode.

11. The trailer of claim 9, wherein the operating modes implemented in the control unit are selected and actuated by a remote control device.

12. The trailer of claim 9, wherein the operating modes implemented in the control unit are selected and actuated by a remote control device.

13. A cycle coupled to a trailer according to claim 12, the remote control device of which, arranged to communicate with the control unit of the trailer and to allow the selection of an operating mode among the operating modes implemented in the control unit, is fixed to the handlebars of the cycle.

14. The trailer of claim 12, wherein the trailer comprises at least one battery rechargeable during the operation of the trailer in resistant mode.

15. The trailer of claim 14, wherein the control unit comprises a module for comparing the speed of the trailer with an intermediate threshold speed and a maximum threshold speed recorded in a memory module of the control unit.

16. The trailer of claim 15, wherein the deformation sensor comprises at least two deformation gauges disposed at 90 degrees from one another, one of the gauges being oriented along the longitudinal axis of the chassis.

\* \* \* \* \*